(No Model.) 2 Sheets—Sheet 1.

W. YOUNG.
MACHINE FOR ATTACHING WIRES TO HEDGE AND OTHER FENCES.

No. 263,280. Patented Aug. 22, 1882.

Attest,
W. H. H. Knight
James Watson

Inventor,
Wesley Young
By Hine & Dixon
His Attys

N. PETERS, Photo-Lithographer, Washington, D. C.

(No Model.) 2 Sheets—Sheet 2.

W. YOUNG.
MACHINE FOR ATTACHING WIRES TO HEDGE AND OTHER FENCES.

No. 263,280. Patented Aug. 22, 1882.

Attest,
W. H. H. Knight,
James Watson.

Inventor,
Wesley Young
By Hill & Dixon
His Attys

UNITED STATES PATENT OFFICE.

WESLEY YOUNG, OF COLUMBUS, OHIO.

MACHINE FOR ATTACHING WIRES TO HEDGE AND OTHER FENCES.

SPECIFICATION forming part of Letters Patent No. 263,280, dated August 22, 1882.

Application filed August 15, 1881. (No model.)

*To all whom it may concern:*

Be it known that I, WESLEY YOUNG, of Columbus, in the county of Franklin and State of Ohio, have invented a certain new and Improved Machine for Attaching Wires to Hedge and other Fences; and I do hereby declare that the following is a full, clear, and exact description and specification thereof, reference being had to the accompanying drawings, in which—

Figure 1:
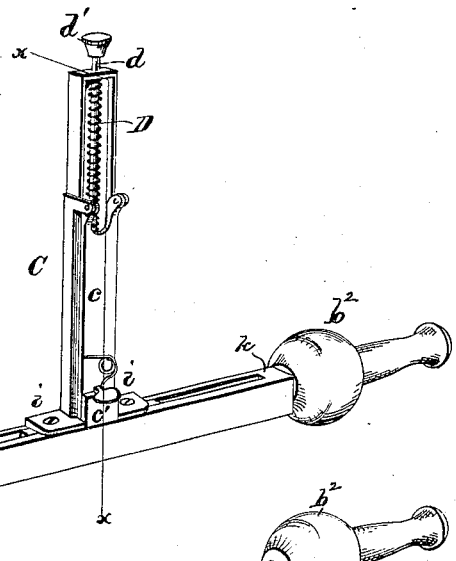
Figure 2:
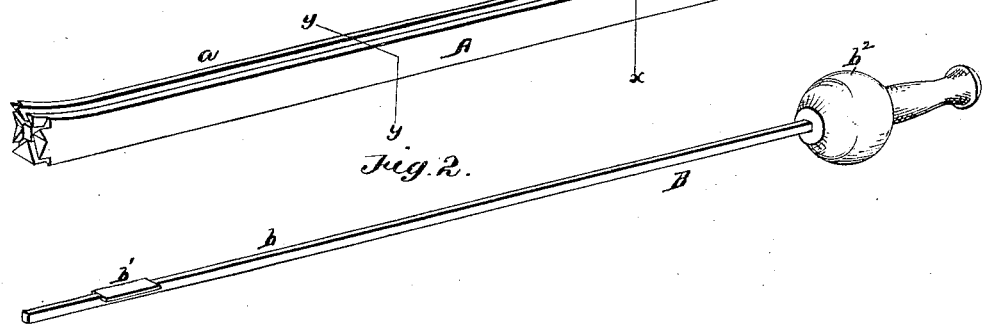
Figure 3:
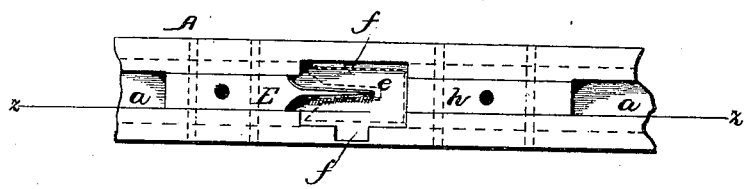
Figure 11:
Figure 4:
Figures 5, 6:
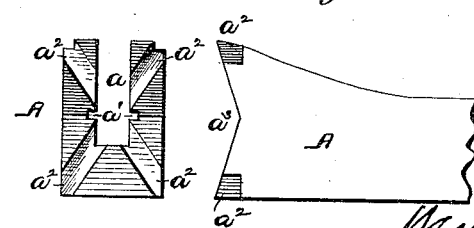
Figure 7:
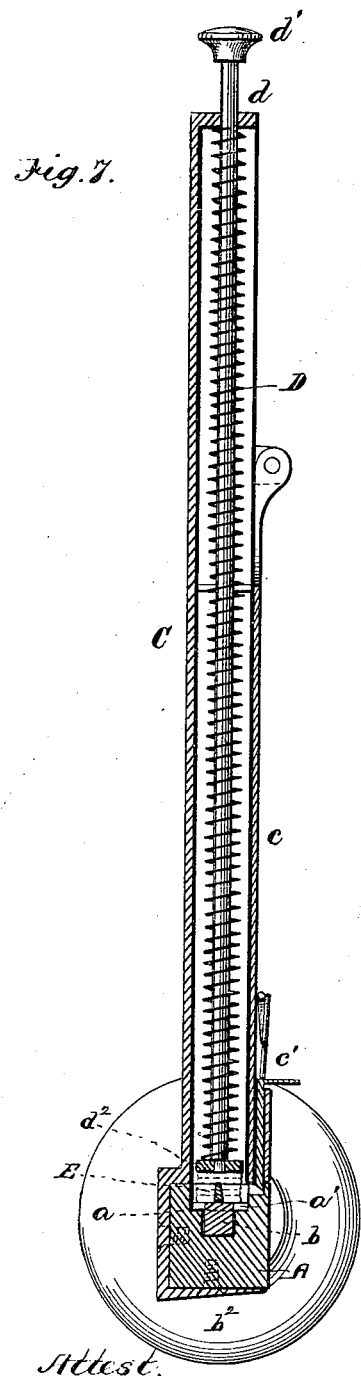
Figure 8:
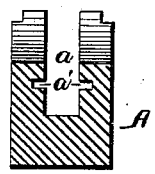
Figure 9:
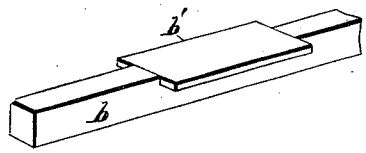
Figure 10:
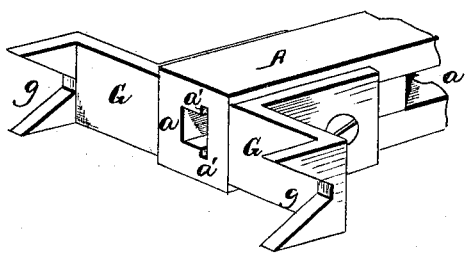

Figure 1 is a perspective view of the machine; Fig. 2, a perspective view of the plunger or ram; Figs. 3 and 4, detached views showing the form and position of the guide-tongue; Figs. 5 and 6, detached views showing the construction of the end of the instrument or machine; Fig. 7, a section in line $x\ x$ of Fig. 1; Fig. 8, a section in line $y\ y$ of Fig. 1; Fig. 9, an enlarged perspective view of the end of the plunger or ram, showing the guide-flanges more clearly; Fig. 10, a modification of the end of the machine, adapting it to nail wire to posts; and Fig. 11, a perspective view of the staple, nail, or rivet used in connection with the machine.

Similar letters of reference indicate the same parts.

Under several inventions owned and practiced by me it has become customary to use wires, and frequently barbed wires, in connection with hedge fences, both to aid in plashing and also as an additional security against the passage of stock through the fences. The attaching of the wires to the hedge-plants has involved more or less labor and inconvenience, rendering the invention of an instrument to facilitate the operation very desirable. The present invention is designed for that purpose, and has been proved by a considerable practical use to be admirably adapted to the purpose, enabling a secure attachment to be conveniently and readily effected in much less time and with much less labor than by the old hand method.

By a slight modification, (shown in Fig. 10,) the instrument is also adapted to very rapid and efficient work in attaching barbed wire to fence-posts for the construction of the ordinary barbed-wire fence.

The invention consists in the instrument for inserting the staples or double-pointed nails to hold the wires to the plants or posts, and in the various mechanical combinations, sub-combinations, and devices involved in its construction.

The double-pointed nail or staple used in connection with the instrument is not claimed herein, but is made the subject of another application for Letters Patent filed by me contemporaneously herewith.

The machine consists of three main elements, viz: a device to hold the wire steady and guide the nails and plunger, a device for feeding the nails, and a plunger, ram, or hammer for driving the nails into the plant or post. The form of the flat double-pointed nail or staple thus driven will be readily understood from an inspection of Fig. 11 without further description.

The machine may be more particularly described as follows:

A is an elongated stock, preferably of metal, having a deep groove, $a$, formed in one side, with a lateral groove or lateral grooves or recesses, $a'\ a'$, in the side wall or walls of said groove $a$, for the purpose of guiding both the hammer and the nails. The end of the stock A at which the nails are driven is slightly recessed, as at $a^3$, and is provided with crossed diagonal grooves or notches $a^2\ a^2$, whose function is to hold the wire steadily and in exactly the right position to enable the staples to straddle it.

The plunger or hammer B (shown in Fig. 2) consists of a long stem, $b$, adapted to fit loosely in the groove $a$, and provided with a side flange or flanges, $b'\ b'$, which fit in the lateral grooves $a'\ a'$. The hammer is also provided with a weighted handle, $b^2$, to increase the momentum and force of the blow. When the hammer is drawn back so that its end clears the feeding mechanism the nails are automatically fed down one by one into its path, and a forward thrust then forces one of them at each stroke into the plant or post, securing the fence-wire firmly thereto.

The feeding mechanism consists of a suitable receptacle to hold the nails, a spring to feed them toward and into the recess or groove $a$, and a tongue to guide them in their movement. The receptacle is attached to and projects from the side of the stock A, as represented at C, and is of any suitable size and form for the purpose. As here shown, it consists of a rectangular tube provided with a hinged door, c, having a snap-latch, c', to hold it closed.

The feeding-spring is shown at D, and is coiled around a rod, d, provided with a projecting handle, d', by which the spring can be retracted to insert the nails. A plate, $d^2$, attached to the inner end of the rod, bears against the upper nail, being pressed against it by the spring.

I usually construct the instrument to hold a charge of about one hundred nails, which are laid in the tube, one on another, in a column, filling the tube from the stem of the hammer out to the plate $d^2$. A few nails are represented in dotted lines in Fig. 7 as being in the instrument ready for use, and a nail is also seen in dotted lines in Fig. 3. The nails are placed in the tube with their points directed toward the discharge end of the instrument. When thus placed they feed down so as to bestride a tongue-guide, E, provided with a projecting point, e, which fits loosely into the crotch of the nails, directing each nail accurately to its proper position for use. When the hammer is not drawn back the inner nail rests against the side of its stem b, with its under surface in line with the under edge of the tongue e. When the hammer is drawn back from under such nail the spring forces the whole column of nails down, the metal walls of the groove a being cut away sufficiently at that point from the lateral grooves a' a' out to the surface, as shown at f f, Figs. 3, 4, to permit the inner nail to enter until its edges rest in said lateral grooves, in which position it remains, supporting the column of nails, until the hammer is thrust forward. The grooves a' a' run directly at the under or inner edge of the tongue e, so that only one nail can pass at one time below the edge of said tongue—to wit, the nail that rests in the grooves a' a', ready for use. The stem of the hammer fills the groove a out to the inner edge of the tongue, so that when thrust forward it clears the tube of the nail and holds the other nails from feeding in until it is drawn back again.

In plashing or otherwise wiring hedges the wire is applied horizontally to the hedges, the plants composing which are bent or inclined at an angle of about forty-five degrees. The end of the stock A in such cases fits the body of the plant and receives the wire in one of the diagonal notches, by which it is accurately presented to the staple or bridge-nail; but in nailing barbed wire to fence-posts in constructing the ordinary barbed-wire fence, in which the posts are broad and flat and the wire runs horizontally, I use the modified form of instrument shown in Fig. 10, having two guides, G G, provided with tapering slots g g, which fit over the wire at the edges of the posts, and thus guide the stock A to the exact position required to make the nails straddle the wires. The guides G should preferably extend far enough from the stock A to pass by the sides of the post and bear only against the wire, although this is not absolutely necessary.

I do not confine myself to the proportions or dimensions herein shown, and I may use any known or obvious equivalent instead of any of the parts described.

In the construction of the instrument it is recommended that the slot a be covered at each end of the space through which the nails feed into the interior of the slot. To this end a plate or block, h, may be inserted and fastened with rivets at one end of the space, and the body of the tongue E, similarly secured by rivets, may be used to close the slot at the other end. The base-flanges of the tube C may be fastened to the blocks h E by screws or other means, as shown at i i, Fig. 1. The slot a is closed at the end next to the handle of the hammer, as shown at k, in order to guide the hammer properly. The latched door, when closed, holds the column of nails in place and assists in guiding them. When open, it permits a new charge to be inserted or any adjustments of the nails or spring to be made.

Having thus described my invention, I claim as new—

1. The combination, with the guide-stock having the groove a and lateral guides a' a', of the guide-tongue E, the tube C and its spring and rod, and the elongated stem or plunger having the flanges b' b', the whole arranged and operating substantially as described.

2. The herein-described device for driving staples, having on the end of its stock A guides to hold the fence-wire in the proper position for the application of the staples, substantially as set forth.

WESLEY YOUNG.

Witnesses:
M. CHURCH,
JAMES WATSON.